UNITED STATES PATENT OFFICE.

CLAYTON W. BEDFORD AND ROBERT L. SIBLEY, OF AKRON, OHIO, ASSIGNORS TO THE GOODYEAR TIRE & RUBBER COMPANY, OF AKRON, OHIO, A CORPORATION OF OHIO.

THIOCARBANILIDE DERIVATIVES IN THE VULCANIZATION OF CAOUTCHOUC.

1,406,718. Specification of Letters Patent. Patented Feb. 14, 1922.

No Drawing. Application filed August 12, 1918. Serial No. 249,580.

*To all whom it may concern:*

Be it known that we, CLAYTON W. BEDFORD and ROBERT L. SIBLEY, citizens of the United States, residing at Akron, in the county of Summit and State of Ohio, have invented a new and useful Improvement in Thiocarbanilide Derivatives in the Vulcanization of Caoutchouc, of which the following is a specification.

The present invention relates to the art of vulcanizing caoutchouc, and will be fully understood from the following specification.

It is well known that aniline serves as an accelerator for the curing of rubber by sulphur, and that the carbon bisulphide reaction product of aniline, i. e., thiocarbanilide, has greater curing power and possesses other advantages over the aniline itself, so that aniline as such has largely been replaced by its derivatives in this use.

Para-phenylene-diamine and para-amido-dimethyl-aniline as well as their carbon bisulphide reaction products are known as valuable accelerators. We have found, however, that the partial reduction of paranitroso-dimethyl-aniline by $H_2S$ produces a base that is not para-amido-dimethyl-aniline and which with carbon bisulphide produces a substituted thiourea which is very valuable as an accelerator.

The thiourea derivative contemplated by the present invention may be prepared from paranitroso-dimethyl-aniline as follows:

Example 1: One molecular weight of paranitroso-dimethyl-aniline is dissolved in water, or, if desired, in a suitable non-aqueous volatile solvent such as benzol, and hydrogen sulphide preferably equal to a molecular weight but less than two molecular weights is passed into and dissolved in the solution at any temperature up to the boiling point of the solvent. The hydrogen sulphide reacts with the paranitroso-dimethyl-aniline with the formation of a base very similar in composition to para-amido-dimethyl-aniline, this base being readily recoverable by the simple evaporation of the solvent and of any excess hydrogen sulphide.

As pointed out in our co-pending application Serial No. 249,579, filed of even date herewith, this base itself constitutes a valuable accelerator. The present invention is particularly directed, however, to the production from this accelerator of a thiourea derivative having still more advantageous properties. This is accomplished by mixing the base in question with an excess of carbon bisulphide. The mixture immediately becomes hot, with the liberation of hydrogen sulphide, and the resulting product is a derivative of thiourea having very high curing power as an accelerator, and imparting high modulus of elasticity and other desirable qualities to the cured rubber compound. In the use of the new accelerator for the curing of rubber it is added to the rubber sulphur mix in proper proportions, as, for example, from one-half to two per cent., and the vulcanization then accomplished in the usual manner.

Example 2: If an excess of carbon bisulphide—that is, more than one molecule of bisulphide for each two molecules of paranitroso-dimethyl-aniline—be used alone or diluted with benzol or some other organic solvent, as the solvent for the paranitroso-dimethyl-aniline during its reaction with hydrogen sulphide, as above described, both of the desired reactions are carried out simultaneously. This procedure is advantageous in that less hydrogen sulphide need be furnished for the carrying of the reaction to the point corresponding to the product obtained in Example 1, for the hydrogen sulphide produced by the carbon bisulphide reaction with the new base at once reacts with the as yet unchanged paranitroso-dimethyl-aniline to produce a further quantity of the base, which, in turn, reacts with the carbon bisulphide. The reaction therefore takes a cyclic course after having been initiated, and the final reaction product constituting the same thiourea derivative as in Example 1, may be obtained without the requirement for the addition of a full mol of hydrogen sulphide.

Upon the evaporation of the excess carbon bisulphide the product is left in a condition ready for use, and may be incorporated in the rubber mix as above described.

Example 3: If, as in Example 2, $H_2S$ is passed into a carbon bisulphide solution of paranitroso-dimethyl-aniline, but instead of limiting the amount of $H_2S$ to that required by Example 1, we add all the $H_2S$ with which the mixture will react, we obtain as a product the carbon bisulphide reaction product of para-amido-dimethyl-aniline together with free sulphur.

For paranitroso-dimethyl-aniline, as given in the foregoing examples, other paranitroso bodies, such for example as paranitroso-phenol may be substituted, the amount of hydrogen sulphide and of carbon bisulphide required for reaction being, of course, on a molecular basis.

While we have set forth in considerable detail one specific manner of carrying out our invention, together with a variant thereof, this is to be regarded as illustrative only, and for the purpose of making the invention more clear. The invention is not to be regarded as limited to the exact procedure named, nor as dependent upon the accuracy of the chemical theories which we have advanced, except in so far as such limitations are included within the terms of the accompanying claims, in which it is our intention to claim all novelty inherent in our invention as broadly as is permissible in view of the prior art.

What we claim is:

1. In the vulcanization of caoutchouc, adding to caoutchouc a small proportion of the thiourea derivative-containing reaction product of carbon bisulphide on the base resulting from the reaction of one mol of paranitroso body with less than two mols of hydrogen sulphide, and heating the resultant mixture with a vulcanizing agent to effect vulcanization.

2. In the vulcanization of caoutchouc, adding to caoutchouc a small proportion of the thiourea derivative-containing reaction product of carbon bisulphide on the base resulting from the reaction of one mol of paranitroso-dimethyl-aniline with less than two mols of hydrogen sulphide, and heating the resultant mixture with a vulcanizing agent to effect vulcanization.

3. In the vulcanization of caoutchouc, adding to caoutchouc a small proportion of the thiourea derivative-containing reaction product of carbon bisulphide on the base resulting from the reaction of paranitroso-dimethyl-aniline and hydrogen sulphide in equimolecular proportions, and heating the resultant mixture with a vulcanizing agent to effect vulcanization.

4. In the vulcanization of caoutchouc, adding to caoutchouc a small proportion of the thiourea derivative-containing product of simultaneous reaction of carbon bisulphide and hydrogen sulphide with paranitroso-dimethyl-aniline and heating the resultant mixture with a vulcanizing agent to effect vulcanization.

CLAYTON W. BEDFORD.
ROBERT L. SIBLEY.